(12) United States Patent
Salekin et al.

(10) Patent No.: US 11,810,435 B2
(45) Date of Patent: Nov. 7, 2023

(54) SYSTEM AND METHOD FOR AUDIO EVENT DETECTION IN SURVEILLANCE SYSTEMS

(71) Applicant: Robert Bosch GmbH, Stuttgart (DE)

(72) Inventors: Asif Salekin, Charlottesville, VA (US); Zhe Feng, Mountain View, CA (US); Shabnam Ghaffarzadegan, San Mateo, CA (US)

(73) Assignee: Robert Bosch GmbH, Stuttgart (DE)

( * ) Notice: Subject to any disclaimer, the term of this patent is extended or adjusted under 35 U.S.C. 154(b) by 696 days.

(21) Appl. No.: 16/976,462

(22) PCT Filed: Feb. 20, 2019

(86) PCT No.: PCT/EP2019/054196
§ 371 (c)(1),
(2) Date: Aug. 27, 2020

(87) PCT Pub. No.: WO2019/166296
PCT Pub. Date: Sep. 6, 2019

(65) Prior Publication Data
US 2021/0005067 A1    Jan. 7, 2021

Related U.S. Application Data

(60) Provisional application No. 62/636,185, filed on Feb. 28, 2018.

(51) Int. Cl.
*G08B 13/16* (2006.01)
*G06F 16/683* (2019.01)
(Continued)

(52) U.S. Cl.
CPC ....... *G08B 13/1672* (2013.01); *G06F 16/683* (2019.01); *G06N 3/045* (2023.01);
(Continued)

(58) Field of Classification Search
CPC ......... G10L 25/30; G10L 25/51; G10L 25/84; G10L 25/81; G10L 25/78; G10L 15/16
See application file for complete search history.

(56) References Cited

U.S. PATENT DOCUMENTS 6,778,226 B1    8/2004    Eshelman et al.
9,443,517 B1    9/2016    Foerster et al.
(Continued)

FOREIGN PATENT DOCUMENTS

CN    101553799 A    10/2009
CN    102509545 A    6/2012
(Continued)

OTHER PUBLICATIONS

Xu et al., "Attention and localization based on a deep convolutional recurrent model for weakly supervised audio tagging." arXiv preprint arXiv:1703.06052 (Year: 2017).*
(Continued)

*Primary Examiner* — Samuel G Neway
(74) *Attorney, Agent, or Firm* — Maginot, Moore & Beck LLP

(57) ABSTRACT

A method and system for detecting and localizing a target audio event in an audio clip is disclosed. The method and system use utilizes a hierarchical approach in which a dilated convolutional neural network to detect the presence of the target audio event anywhere in an audio clip based on high level audio features. If the target audio event is detected somewhere in the audio clip, the method and system further utilizes a robust audio vector representation that encodes the inherent state of the audio as well as a learned relationship between state of the audio and the particular target audio event that was detected in the audio clip. A bi-directional long short term memory classifier is used to model long term dependencies and determine the boundaries in time of the
(Continued)

target audio event within the audio clip based on the audio vector representations.

20 Claims, 7 Drawing Sheets

(51) Int. Cl.
    *G06N 3/049*     (2023.01)
    *G10L 15/26*     (2006.01)
    *G10L 25/30*     (2013.01)
    *G06N 3/045*     (2023.01)
    *G10L 15/16*     (2006.01)
    *G10L 25/51*     (2013.01)
    *G10L 25/78*     (2013.01)
    *G10L 25/81*     (2013.01)
    *G10L 25/84*     (2013.01)
    *G10L 15/08*     (2006.01)

(52) U.S. Cl.
    CPC .............. *G06N 3/049* (2013.01); *G10L 15/16* (2013.01); *G10L 15/26* (2013.01); *G10L 25/30* (2013.01); *G10L 25/51* (2013.01); *G10L 25/78* (2013.01); *G10L 25/81* (2013.01); *G10L 25/84* (2013.01); *G10L 2015/088* (2013.01)

(56) References Cited

U.S. PATENT DOCUMENTS

| | | | |
|---|---|---|---|
| 9,799,327 | B1 | 10/2017 | Chan et al. |
| 2011/0184952 | A1 | 7/2011 | Chen |
| 2015/0095027 | A1 | 4/2015 | Parada San Martin et al. |
| 2015/0279351 | A1 | 10/2015 | Nguyen et al. |
| 2016/0111107 | A1 | 4/2016 | Erdogan et al. |
| 2016/0284346 | A1 | 9/2016 | Visser et al. |
| 2016/0364963 | A1 | 12/2016 | Matsuoka et al. |
| 2017/0062010 | A1 | 3/2017 | Pappu et al. |
| 2017/0076717 | A1 | 3/2017 | Parada San Martin et al. |
| 2017/0092265 | A1 | 3/2017 | Sainath et al. |
| 2017/0092297 | A1 | 3/2017 | Sainath et al. |
| 2017/0154638 | A1 | 6/2017 | Hwang et al. |
| 2017/0323653 | A1* | 11/2017 | Hassan al Banna .......... G10L 21/0216 |
| 2017/0372725 | A1 | 12/2017 | Khoury et al. |
| 2019/0259378 | A1* | 8/2019 | Khadloya .............. G06N 20/10 |
| 2020/0066297 | A1* | 2/2020 | Liu .......... G06N 3/044 |
| 2021/0005067 | A1* | 1/2021 | Salekin ................... G10L 25/30 |

FOREIGN PATENT DOCUMENTS

| | | |
|---|---|---|
| CN | 103730115 A | 4/2014 |
| CN | 104361887 A | 2/2015 |
| CN | 106251860 A | 12/2016 |
| CN | 107305774 A | 10/2017 |
| JP | 2015-057630 A | 3/2015 |
| JP | 2015-212731 A | 11/2015 |

OTHER PUBLICATIONS

Kumar et al., "Audio event detection using weakly labeled data." Proceedings of the 24th ACM international conference on Multimedia (Year: 2016).*
Wang et al., "Audio-based multimedia event detection using deep recurrent neural networks." 2016 IEEE international conference on acoustics, speech and signal processing (ICASSP). IEEE (Year: 2016).*
Lu et al., "Unsupervised Anchor Space Generation for Similarity Measurement of General Audio", IEEE, ICASSP, 2008 (4 pages).
Ntalampiras, S. et al., "An Adaptive Framework for Acoustic Monitoring of Potential Hazards," EURASIP Journal on Audio, Speech, and Music Processing, Oct. 2009, Article ID 594103 (15 pages).
Clavel, C. et al., "Fear-type emotion recognition and abnormal events detection for an audio-based surveillance system," WIT Transactions on Information and Communication, 2008, vol. 39, pp. 471-479 (9 pages).
Valenti, M. et al., "DCASE 2016 Acoustic Scene Classification Using Convolutional Neural Networks," Proceedings of the Workshop on Detection and Classification of Acoustic Scenes and Events (DCASE2016 Workshop), Sep. 2016 (5 pages).
Lavner, Y. et al., "Baby Cry Detection in Domestic Environment using Deep Learning," International Conference on the Science of Electrical Engineering (ICSEE), Nov. 2016 (5 pages).
Dai, W. et al., "Very Deep Convolutional Neural Networks for Raw Waveforms," IEEE International Conference on Acoustics, Speech, and Signal Processing (ICASSP), Mar. 2017, pp. 421-425 (5 pages).
Kumar, A. et al., "Deep CNN Framework for Audio Event Recognition using Weakly Labeled Web Data," arXiv:1707.02530v2 [cs.SD] Jul. 20, 2017 (5 pages).
Atrey, P. K. et al., "Audio Based Event Detection for Multimedia Surveillance," IEEE International Conference on Acoustics Speech and Signal Processing Proceedings (ICASSP), May 2006, pp. V-813-V-816 (4 pages).
Dennis, J. et al., "Spectrogram Image Feature for Sound Event Classification in Mismatched Conditions," IEEE Signal Processing Letters, Feb. 2011, vol. 18, No. 2, pp. 130-133 (4 pages).
Dennis, J. et al., "Image Feature Representation of the Subband Power Distribution for Robust Sound Event Classification," IEEE Transactions On Audio, Speech, and Language Processing, Feb. 2013, vol. 21, No. 2, pp. 367-377 (11 pages).
Guo, G. et al., "Content-Based Audio Classification and Retrieval by Support Vector Machines," IEEE Transactions on Neural Networks, Jan. 2003, vol. 14, No. 1, pp. 209-215 (7 pages).
Zhou, X. et al., "HMM-Based Acoustic Event Detection with AdaBoost Feature Selection," In Multimodal Technologies for Perception of Humans, RT 2007, CLEAR 2007, Lecture Notes in Computer Science (LNCS), vol. 4625. Springer, Berlin, Heidelberg, pp. 345-353, 2008 (9 pages).
McLoughlin, I. et al., "Robust Sound Event Classification Using Deep Neural Networks," IEEE/ACM Transactions on Audio, Speech, and Language Processing, Mar. 2015, vol. 23, No. 3, pp. 540-552 (13 pages).
Li, J. et al., "A Comparison of Deep Learning Methods for Environmental Sound Detection," IEEE International Conference on Acoustics, Speech and Signal Processing (ICASSP), Mar. 2017, pp. 126-130 (5 pages).
Çakir, E. et al., "Convolutional Recurrent Neural Networks for Polyphonic Sound Event Detection," IEEE/ACM Transactions on Audio, Speech, and Language Processing, Jun. 2017, vol. 25, No. 6, ppp. 1291-1303 (13 pages).
Parascandolo, G. et al., "Recurrent Neural Networks for Polyphonic Sound Event Detection in Real Life Recordings," IEEE International Conference on Acoustics, Speech and Signal Processing (ICASSP), Mar. 2016, pp. 6440-6444 (5 pages).
International Search Report corresponding to PCT Application No. PCT/EP2019/054196, dated Jun. 5, 2019 (4 pages).
Kisler, T., "forced-alignment-tools," Jul. 10, 2018, available at https://github.com/pettarin/forced-alignment-tools/blob/master/README.md (last visited Aug. 27, 2020) (6 pages).
Sercu, T. et al., "Dense Prediction on Sequences with Time-Dilated Convolutions for Speech Recognition," 30th Conference on Neural Information Processing Systems (NIPS 2016), Nov. 28, 2016, arXiv:1611.09288v1 [cs.CL] Nov. 28, 2016 (5 pages).
Brownlee, J., "How to Develop a Bidirectional LSTM for Sequence Classification in Python with Keras," Jun. 16, 2017 available at https://machinelearningmastery.com/develop-bidirectional-lstm-sequence-classification-python-keras/ (last visited Aug. 27, 2020) (14 pages with comment pages removed).
"Dilated Convultion," A Blog from Human-Engineer-being, Feb. 6, 2017, available at https://www.erogol.com/dilated-convolution/ (last visited Aug. 27, 2020) (4 pages).
Van Den Oord, A. et al., "WaveNet: A Generative Model for Raw Audio," Sep. 19, 2016, arXiv:1609.03499v2 [cs.SD] Sep. 19, 2016 (15 pages).

\* cited by examiner

SYSTEM AND METHOD FOR AUDIO EVENT DETECTION IN SURVEILLANCE SYSTEMS

This application is a 35 U.S.C. § 371 National Stage Application of PCT/EP2019/054196, filed on Feb. 20, 2019, which claims the benefit of priority of U.S. provisional application Ser. No. 62/636,185, filed on Feb. 28, 2018 the disclosures of which are incorporated herein by reference in their entirety.

FIELD

This disclosure relates generally to the field of audio analytics and human machine interaction and, more particularly, to the field of audio surveillance.

BACKGROUND

Unless otherwise indicated herein, the materials described in this section are not prior art to the claims in this application and are not admitted to the prior art by inclusion in this section.

In recent years, automated surveillance systems have become increasingly popular and important both in private and public environments. Most of the existing surveillance systems work mainly at the visual level or based on video information. The effectiveness of this type of system depends on the environmental conditions. Particularly, this type of system is likely to fail at night, in foggy environments or in other low visibility conditions. Thermal infrared sensors can be a less invasive alternative, but they are highly dependent on temperature, and the separation between background and foreground objects can be problematic. As a solution, using audio to provide complimentary information to video or infrared sensors can greatly enhance an existing system. Furthermore, audio modality can provide a very rich signal on its own, especially in scenarios where an event of interest has very distinct audio characteristics but not so distinct visual characteristics, such as a baby crying, glass breaking, a gun being shot, or a person screaming.

Audio event detection (AED), with the goal of understanding the environment and detecting events and anomalies, can be useful in variety of applications such as smart homes and smart cars. The need for AED in smart homes is a fast growing area, given the importance of having secure lifestyle. Moreover, personalizing the behavior of smart home is a key aspect to increasing the level of comfort and security. With the development of autonomous and smart car systems, automated car surveillance systems are gaining more interest, as well. Since, many modern cars are already equipped with embedded speech recognition engines, AED systems can be easily deployed in car and the additional computational processing for AED can be provided relatively easily. Additionally, the private, non-invasive, and robust characteristics of AED makes in car and home audio surveillance more suitable than other surveillance modalities. AED has many other applications, such as, monitoring machines and infrastructures, smart facility management, external audio perception for driving assistance, etc.

In recent years, consumer-generated audio data on the Internet has experienced rapid growth. The popular YouTube video service alone reportedly receives 300 hours of multimedia data uploads every minute. However, the vast majority of these consumer-produced data carry little or no content annotation. Though there are some available datasets that contain event level annotation for automated surveillance systems, the amount of labelled audio event data is very low. Hence, a majority of the audio event detection studies have perform their evaluation on small data. Consequently, improvements to systems that detect audio events in recorded audio data that do not need a large corpus of previously annotated training data would be beneficial.

SUMMARY

A method for detecting and localizing a target audio event in an audio clip is disclosed. The method comprises: receiving, with a processor, an audio clip; determining, with the processor, a plurality of audio features based on the audio clip; determining, with the processor, whether the target audio event is present in the audio clip using a first neural network based on the plurality of audio features; determining, with the processor, in response to determining that the target audio event is present in the audio clip, a plurality of vectors based on (i) the plurality of audio features and (ii) the target audio event, the vectors in the plurality of vectors indicating a correlation between audio features in the plurality of audio features and the target audio event; and determining, with the processor, a position in time of the target audio event within the audio clip using a second neural network based on the plurality of vectors.

A system for detecting and localizing a target audio event in an audio clip is disclosed. The system comprises: a microphone configured to record audio clips of an environment; and a processor operably connected to the microphone. The processor is configured to: receive an audio clip recorded by the microphone; determine a plurality of audio features based on the audio clip; determine whether the target audio event is present in the audio clip using a first neural network based on the plurality of audio features; determine, in response to determining that the target audio event is present in the audio clip, a plurality of vectors based on (i) the plurality of audio features and (ii) the target audio event, the vectors in the plurality of vectors indicating a correlation between audio features in the plurality of audio features and the target audio event; and determine a position in time of the target audio event within the audio clip using a second neural network based on the plurality of vectors.

BRIEF DESCRIPTION OF THE DRAWINGS

The foregoing aspects and other features of method and system are explained in the following description, taken in connection with the accompanying drawings.

DETAILED DESCRIPTION

Figure 1:
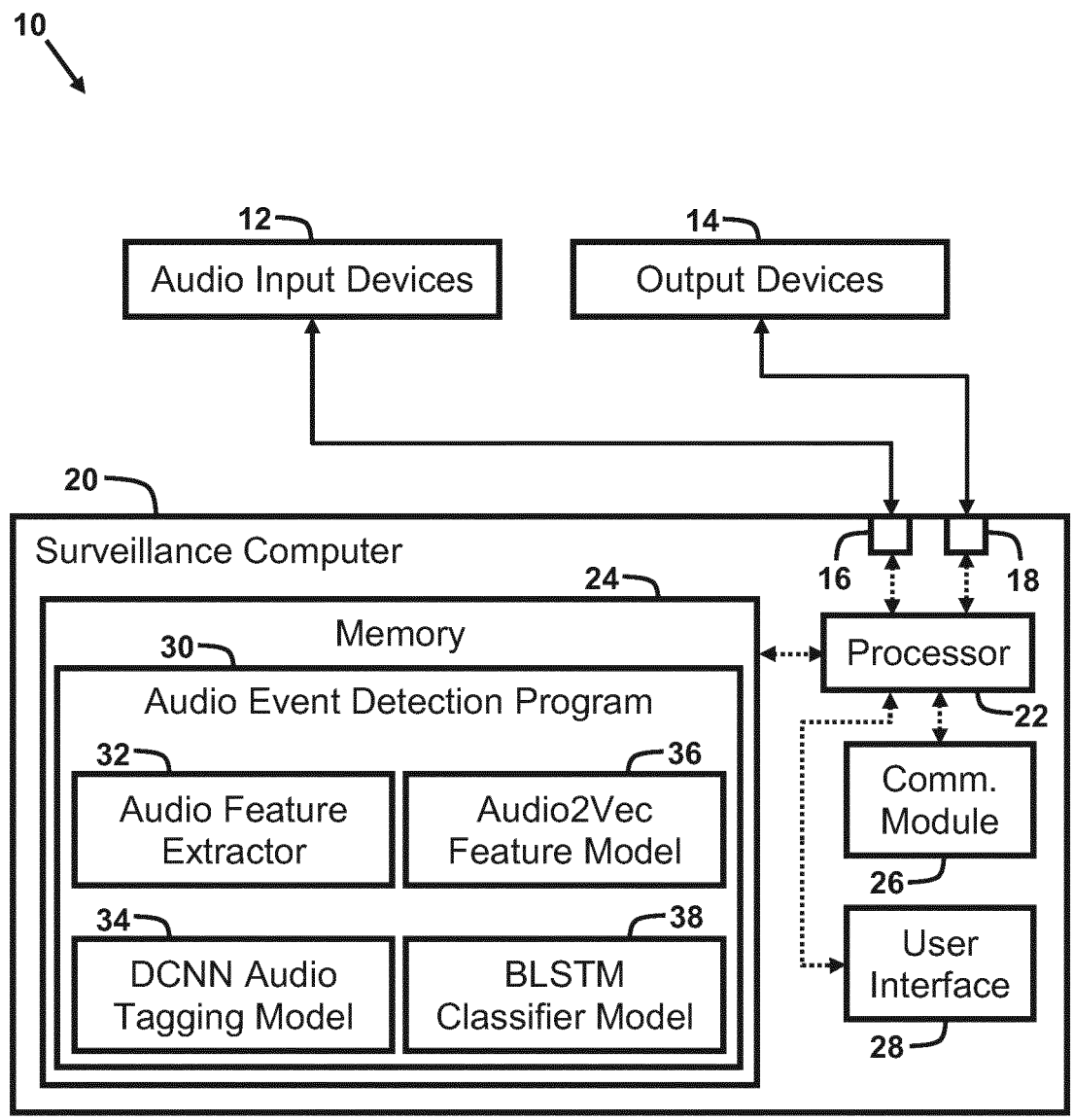
FIG. 1 is a schematic diagram illustrating an audio surveillance system.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

FIG. 1 shows an exemplary embodiment of a surveillance system 10 that provides surveillance, at least in part, by detecting certain audio events of interest, which are referred to herein as "target audio events." The surveillance system 10 can be employed in a wide variety of settings including, but not limited to, a home, an automobile, a commercial building, and certain public places. Although the surveillance system 10 may combine several surveillance technologies, it will be appreciated that audio-based surveillance has several advantages compared to video-based surveillance. Particularly, audio processing generally has lower memory and processing requirements due to its one-dimensional nature compared to video processing, which is three-dimensional in nature. Additionally, microphones can record omni-directional audio, whereas video cameras generally have a limited angular field of view. Furthermore, compared to the shorter wavelengths of light, the longer wavelengths of sound waves allow for specular reflections on many more surfaces, such that audio surveillance is more robust against environmental obstacles. Audio surveillance is also more robust against wide variations in illumination and temperature. Additionally, many target audio events have distinctive audio signatures but have difficult or impossible to discern visual signatures (e.g., a baby crying, or a gunshot). Finally, audio-based surveillance is generally more privacy friendly compared to the video-based surveillance.

In the illustrated embodiment, the surveillance system 10 includes one or more audio input devices 12, one or more output devices 14, and a surveillance computer 20. The audio input devices 12 may comprise, in particular, one or more microphones arranged in the environment (e.g., a home, automobile, etc.) and configured to record audio surveillance signals, which are provided to the surveillance computer 20. As discussed in greater detail below, the surveillance computer 20 is configured to process the audio surveillance signals to detect certain target audio events. The output devices 14 may comprise, for example, a display screen, an alarm siren, speakers, and other similar devices that can be used to, for example, alert a user to the detection of certain target audio events, enable a user to review a potential audio event of interest, or provide a deterrence effect in the case of security related audio events. The output devices 14 may be arranged in the local environment or arranged remote from the environment.

The audio input devices 12 and the output devices 14 are operably connected with the surveillance computer 20 via interfaces 16, 18. In some embodiments, the interfaces 16, 18 may comprise physical connectors, via which wired connections between the audio input devices 12 and the surveillance computer 20 and/or between the output devices 14 and the surveillance computer 20 are established. In some embodiments, the interfaces 16, 18 may comprise wireless transceivers, via which wireless connections between the audio input devices 12 and the surveillance computer 20 and/or between the output devices 14 and the surveillance computer 20 are established. In some embodiments, a mix of wired and wireless connections may be utilized. Additionally, in some embodiments, some of audio input devices 12 and/or some the output devices 14 may be integrated directly with the surveillance computer 20 (e.g., a display screen and microphone of an in-car infotainment system that embodies the surveillance computer).

In the illustrated embodiment, the surveillance computer 20 comprises a processor 22, memory 24, a user interface 26, and a communications module 28. However, the illustrated embodiment of the surveillance computer 20 is only one exemplary embodiment of a surveillance computer 20 and is merely representative of any of various configurations of a computer system or the like that is operative in the manner set forth herein. Moreover, it will be appreciated that the surveillance computer 20 need not be a standalone dedicated computer used only for audio surveillance and may include a wide variety of additional functions that are unrelated to audio surveillance. For example, in addition to a dedicated computer system, the surveillance computer 20 may alternatively comprise an in-car infotainment system or other multi-purpose vehicle computer, a hub for a home-security system or broader smart home automation system, a personal computer, a smart phone, a tablet computer, a remote server, or the like. Accordingly, the surveillance computer 20 may comprise several additional components not described or illustrated herein.

The processor 22 is configured to execute program instructions to operate the surveillance computer 20 to enable the features, functionality, characteristics and/or the like as described herein. To this end, the processor 22 is operably connected to the memory 24, the user interface 26, and the communications module 28. The processor 22 generally comprises one or more processors which may operate in parallel or otherwise in concert with one another. It will be recognized by those of ordinary skill in the art that a "processor" includes any hardware system, hardware mechanism or hardware component that processes data, signals, or other information. Accordingly, the processor 22 may include a system with a central processing unit, multiple processing units, graphics processing units, digital signal processors, application specific integrated circuits (ASICs), programmable or non-programmable logic devices, or any other circuitry for achieving the described functionality.

The memory 24 may be of any type of device capable of storing information accessible by the processor 22, such as a memory card, ROM, RAM, write-capable memories, read-only memories, hard drives, discs, flash memory, or any of various other computer-readable medium serving as data storage devices as will be recognized by those of ordinary skill in the art. As discussed below, the memory 24 is configured to store various program instructions and various data to enable the features, functionality, characteristics and/or the like as described herein.

The communications module 26 of the surveillance computer 20 provides an interface that allows for communication with any of various devices using wired or wireless communications technologies. In some embodiments, the communications module 26 may comprise a local area network port and/or a wide area network port, with corresponding modems or other conventional hardware configured for wired communication with a local area network or wide area network. In some embodiments, the communications module 26 may comprise one or more wireless transceivers configured to transmit and receive communications signals using a wireless communications technology, such as Wi-Fi, Bluetooth, Z-wave, ZigBee, or the like. In some embodiments, the communications module 26 may comprise one or more wireless transceivers configured to communicate with a wireless telephony network, such as CDMA or GSM transceivers.

The surveillance computer 20 may be operated locally or remotely by a user. To facilitate local operation, the surveillance computer 20 may include an interactive user interface 110. Via the user interface 28, a user may access and execute software instructions, and may collect data from and store data to the memory 24. In at least one embodiment, the user interface 28 may suitably include an LCD display screen or the like, a mouse or other pointing device, a keyboard or other keypad, speakers, and a microphone, as will be recognized by those of ordinary skill in the art. Alternatively, in some embodiments, a user may operate the surveillance computer 20 remotely from another computing device which is in communication therewith via the communication module 26 and has an analogous user interface.

Audio Event Detection Model

The surveillance computer 20 is configured to receive audio surveillance signals from the audio input devices 12 and to process the audio surveillance signals to detect certain target audio events. Particularly, in some embodiments, the processor 22 is configured to receive the audio surveillance signals in the form of audio clips having a predetermined length (e.g., 30 seconds). In some embodiments, the processor is configured to receive the audio surveillance signals in the form of an audio stream and divide the audio stream into audio clips having a predetermined length (e.g., 30 seconds). The processor 22 is configured to process the individual audio clips to detect the presence and location in time of target audio events. To this end, the program instructions stored on the memory 24 include an audio event detection program 30 which is executed by the processor 22 to process the audio surveillance signals received from the audio input devices 12 and to detect certain target audio events.

The audio event detection program 30 utilizes robust audio event detection model, which comprises four primary components: an audio feature extractor 32, a dilated convolution neural network (DCNN) audio tagging model 34, an audio-to-vector (Audio2Vec) feature model 36, and a bi-directional long short-term memory (BLSTM) classifier model 38. The audio feature extractor 32 is configured to segment an individual audio clip into a plurality of preferably overlapping windows and extract low level descriptors and high level descriptors that collectively represent the inherent state of the audio clip in each window. The DCNN audio tagging model 34 is configured to detect and tag the presence of a target audio event in the audio clip. The Audio2Vec feature model 36 is configured to generate a robust vector representation of each window of the audio clip that advantageously conveys the relationship between the inherent audio states and the detected target audio event. Finally, the BLSTM classifier model 38 is configured to identify the boundaries and/or positions in time of the detected target audio event in the audio clip.

As discussed in greater detail below, some components of the audio event detection model utilize neural networks that can broadly be considered machine learning models. As used herein, the term "machine learning model" refers to a system or set of program instructions and/or data configured to implement an algorithm, process, or mathematical model that predicts and provides a desired output based on a given input. It will be appreciated that parameters of a machine learning model are not explicitly programmed and the machine learning model is not, in the traditional sense, explicitly designed to follow particular rules in order to provide the desired output for a given input. Instead, the neural networks are provided with a corpus of training data from which identifies or "learns" patterns and statistical relationships or structures in the data, which are generalized to make predictions with respect to new data inputs. The result of the training process is embodied in a plurality of learned parameters, kernel weights, and/or filter values that are used in the various layers of the neural networks to perform various operations or functions.

In the description of the audio event detection program 30 and/or the audio event detection model, statements that a software component or method step performs some process/function or is configured to perform some process/function means that a processor or controller (e.g., the processor 22) executes corresponding program instructions stored in a memory (e.g., the memory 24) to perform the stated operation or function. Similarly, statements that a neural network or neural network layer performs some process/function or is configured to perform some process/function means that a processor or controller (e.g., the processor 22) executes corresponding program instructions stored in a memory (e.g., the memory 24) with reference to the parameters, kernel weights, and/or filter values learned in the respective training process to perform the stated operation or function.

In at least one embodiment, the audio event detection program 30 and/or the audio event detection model thereof utilizes a synthetic dataset for training. Particularly, it will be appreciated that, given a limited amount of available annotated data, it is a challenge to develop an audio event detection system that is robust in different environments. Particularly, conventional AED surveillance approaches generally utilize limited domain specific datasets and, therefore, suffer from a lack of robustness. In contrast, the audio event detection model of the audio event detection program 30 advantageously employs a robust detection approach for audio events, with limited labeled audio event data, by generating large synthetic mixture of labeled audio events in various environments. In this way, the audio event detection model of the audio event detection program 30 advantageously provides a robust model for audio surveillance applications with limited available data.

The audio event detection model of the audio event detection program 30 is configured to detect a predetermined number of target audio events. For simplicity, the audio event detection model is described herein as detecting only four target audio events: (1) a baby crying, (2) glass breaking, (3) a gun being shot, and (4) a person screaming. However, it will be appreciated that the audio event detection model can be extended to detect any number of unique target audio events.

A synthetic training dataset can be generated for each target audio event based on a modest number of isolated audio samples for each target audio event (e.g., only ~100-150 samples for each target audio event) in combination with a larger number of background audio clips (e.g., ~1000 background audio clips). The isolated audio samples can be generated manually or collected from an existing dataset (e.g., the freesound dataset or the MIVIA audio event dataset). Similarly, the background audio clips may also generated manually or collected from an existing dataset (e.g., the TUT Acoustic Scenes 2016 development dataset). The background audio clips may represent a wide variety of environmental and/or acoustic scenes, such as a bus, a train, a cafe, a car, a city center, a forest, a store, a home, a beach, a library, a metro station, an office, a park, etc.

The synthetic training dataset for a particular target audio event is generated by combining isolated audio samples for the target audio event with the background audio clips. Particularly, to generate each training audio clip, a random number of randomly selected isolated audio samples (which may include no isolated audio samples) are selected for mixture with a randomly selected background audio clip. The isolated audio samples are synthetically mixed with the background audio clip at a randomly selected position(s) to generate a training audio clip. In one embodiment, training audio clips are generated with a randomly selected event-to-background volume ratio. In at least one embodiment, the training audio clips are cut to a predetermined length (e.g., 30 seconds). The training audio clips are labeled for presence or non-presence of the target audio event. Additionally, the training audio clips that include the target audio event are annotated to indicate the position in time of the target audio event within the training audio clip.

Audio Feature Extraction

Figure 2:
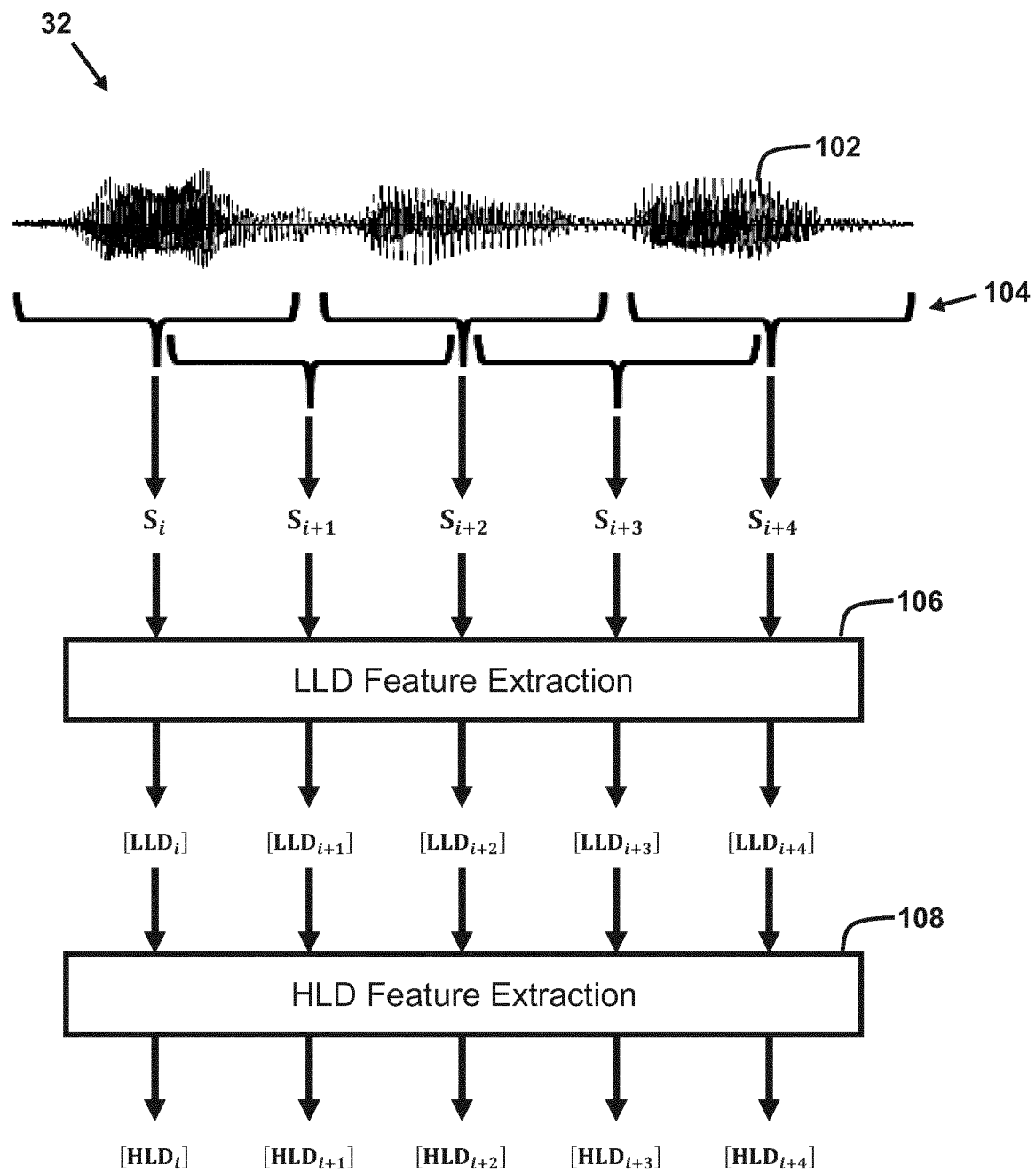
FIG. 2 shows a logical flow diagram illustrating operations of an audio feature extractor of an audio event detection program.

FIG. 2 shows a logical flow diagram illustrating the operations of the audio feature extractor 32 of the audio event detection program 30. The audio feature extractor 32 receives as an input an individual audio clip 102. As discussed above, each individual audio clip generally has a predetermined length (e.g., 30 seconds). The processor 22 is configured to execute program instructions corresponding to the audio feature extractor 32 to segment (104) the audio clip 102 into a sequence of window segments $S_1, \ldots, S_N$, where N is the total number of window segments for the respective audio clip 102. In at least one embodiment, each window segment $S_i$ has a first predetermined length (e.g., 500 ms) and has a predetermined amount or percentage of temporal overlap with adjacent window segments (e.g., 300 ms or 60% overlap). It will be appreciated that the total number of window segments N (e.g., 148) is a function of the predetermined length (e.g., 30 seconds) of the audio clip 102, the first predetermined length (e.g., 500 ms) of each window segment, and the predetermined amount or percentage of temporal overlap with adjacent window segments (e.g., 300 ms or 60% overlap).

The processor 22 is configured execute program instructions corresponding to the audio feature extractor 32 to extract one or more low level descriptor (LLD) features $LLD_i$ from each window segment $S_i$, where $i \in [1, \ldots, N]$ (block 106). To extract the LLD features, the processor 22 is configured to further segment each window segment $S_i$ into a sequence of sub-segments $SS_{ij}$ (not shown), where $j \in [1, \ldots, n]$ and n is the total number of sub-segments $SS_{ij}$ in each window segment $S_i$. In at least one embodiment, each sub-segment $SS_{ij}$ has a second predetermined length (e.g., 25 ms) that is smaller than the first predetermined length of each window segment $S_i$ and has a predetermined amount or percentage of temporal overlap with adjacent sub-segments (e.g., 10 ms or 60% overlap). It will be appreciated that the total number of sub-segments in each window segment n (e.g., 50) is a function of first predetermined length (e.g., 500 ms) of each window segment, second predetermined length (e.g., 25 ms) of each sub-segment, and the predetermined amount or percentage of temporal overlap with adjacent sub-segments (e.g., 10 ms or 60% overlap).

The LLD features extracted from each sub-segment $SS_{ij}$ by the processor 22 may include, for example, a zero crossing rate of each sub-segment $SS_{ij}$ (1-dimensional), an energy of each sub-segment $SS_{ij}$ (1-dimensional), a spectral centroid of each sub-segment $SS_{ij}$ (1-dimensional), a pitch of each sub-segment $SS_{ij}$ (1-dimensional), and Mel-Frequency Cepstral Coefficients (MFCC) for each sub-segment $SS_{ij}$ (13-dimensional). In some embodiments, the processor 22 is further configured to determine delta coefficient $\Delta$ (i.e. rate of change) for some or all of the LLD feature types (thereby doubling the dimensions of each LLD feature type). In some embodiments, the processor 22 is configured to determine both a delta coefficient $\Delta$ and delta-delta coefficient $\Delta\Delta$ (i.e. acceleration of change) for some or all of the LLD feature types (thereby tripling the dimensions of each LLD feature type). For each window segment $S_i$, the extracted features $LLD_i$ includes a set of features $LLD_{ij}$ for each sub-segment $SS_{ij}$ (not shown), where $i \in [1, \ldots, N]$ and $j \in [1, \ldots, n]$. Each set of features $LLD_{ij}$ has dimensions $m_{LLD}$ equal to the total number of LLD feature dimensions for each sub-segment $SS_{ij}$ (e.g., 34 dimensions total if all of the exemplary LLD feature types and corresponding delta coefficients $\Delta$ are used). Thus, the extracted features $LLD_i$ for each window segment $S_i$ have dimensions $n \times m_{LLD}$, where n is the total number of sub-segments $SS_{ij}$ and $m_{LLD}$ is the total number of LLD feature dimensions for each sub-segment $SS_{ij}$.

The processor 22 is configured execute program instructions corresponding to the audio feature extractor 32 to extract one or more of high level descriptor (HLD) features $HLD_i$ for each window segment $S_i$, based on the respective extracted features $LLD_i$ for the respective window segment $S_i$ (block 108). The processor 22 may be configured to determine a variety of HLD features (which may also be referred to herein as "functionals") for each window segment $S_i$ that may include, for example, a minimum, a maximum, a mean, a median, a standard deviation, a variance, a skew and a kurtosis (each being 1-dimensional). Each HLD feature is determined with respect to each LLD feature type for the respective window segment $S_i$ (i.e., a maximum of each LLD feature dimension for the respective window segment $S_i$ is determined, a mean of each LLD feature dimension for the respective window segment $S_i$ is determined, and so on). Thus, for each window segment $S_i$, the extracted HLD features $HLD_i$ has dimensions M (e.g., 272), where $M = m_{HLD} \times m_{LLD}$, $m_{LLD}$ being the total number of LLD feature dimensions (e.g., 34), and $m_{HLD}$ being the number of HLD feature types applies to each of the LLD feature dimensions (e.g., 8 if all the functionals listed above are used). Therefore, for each audio clip, the extracted HLD feature set $HLD_1, \ldots, HLD_N$ takes the form of a N×M matrix, where N is the total number of window segments for the respective audio clip 102 and M is the total number of HLD features per window segment $S_i$. The extracted HLD feature set $HLD_1, \ldots, HLD_N$ represents the inherent audio states of the window segments $S_1, \ldots, S_N$ of the audio clip 102.

As used herein, it should be appreciated that the terms "HLD features" and "LLD features" both encompass to any type of audio feature extracted from an audio clip. As used herein, the phrase "audio feature" refers to any qualitative or quantitative measure, metric, or the like calculated with respect to a portion of an audio clip. The distinction between the HLD features and the LLD features is only that the HLD features are extracted with respect to the relatively longer windows segments $S_i$, whereas the LLD features are extracted with respect to the relatively shorter sub-segments $SS_{ij}$.

In one embodiment, to reduce the computation cost of training and model overfitting, the processor 22 is configured to perform a feature selection processes to reduce the dimensionality of the extracted HLD feature sets HLD$_1$, ..., HLD$_N$. In particular, the processor 22 is configured to select a subset of the HLD features extracted for each window segment S$_i$ (e.g., select 30 features from the pool of 272 features), such that the feature dimension M of the extracted HLD feature set HLD$_1$, ..., HLD$_N$ is reduced to M$_R$. In one embodiment, the processor 22 is configured to use a random forest based feature selection technique to choose the best subset of HLD features for a particular target audio event. It will be appreciated that the selected subset of HLD features will generally be different for each target audio event. The tree-based strategies used by random forest techniques naturally rank the HLD features by how well they improve the purity of the node. This means decrease in impurity over all trees (called gini impurity). Nodes with the greatest decrease in impurity happen at the start of the trees, while nodes with the least decrease in impurity occur at the end of trees. Thus, in one embodiment, the processor is configured to prune the trees (HLD features) below a particular node to create the selected subset of the most important features. Thus, after reduction, the extracted HLD feature set HLD$_1$, ..., HLD$_N$ takes the form of a N×M$_R$ matrix, where M$_R$ is the reduced number of HLD features per window segment S$_i$ (e.g., 30 from the pool of 272).

Audio Event Tagging

Figure 3:
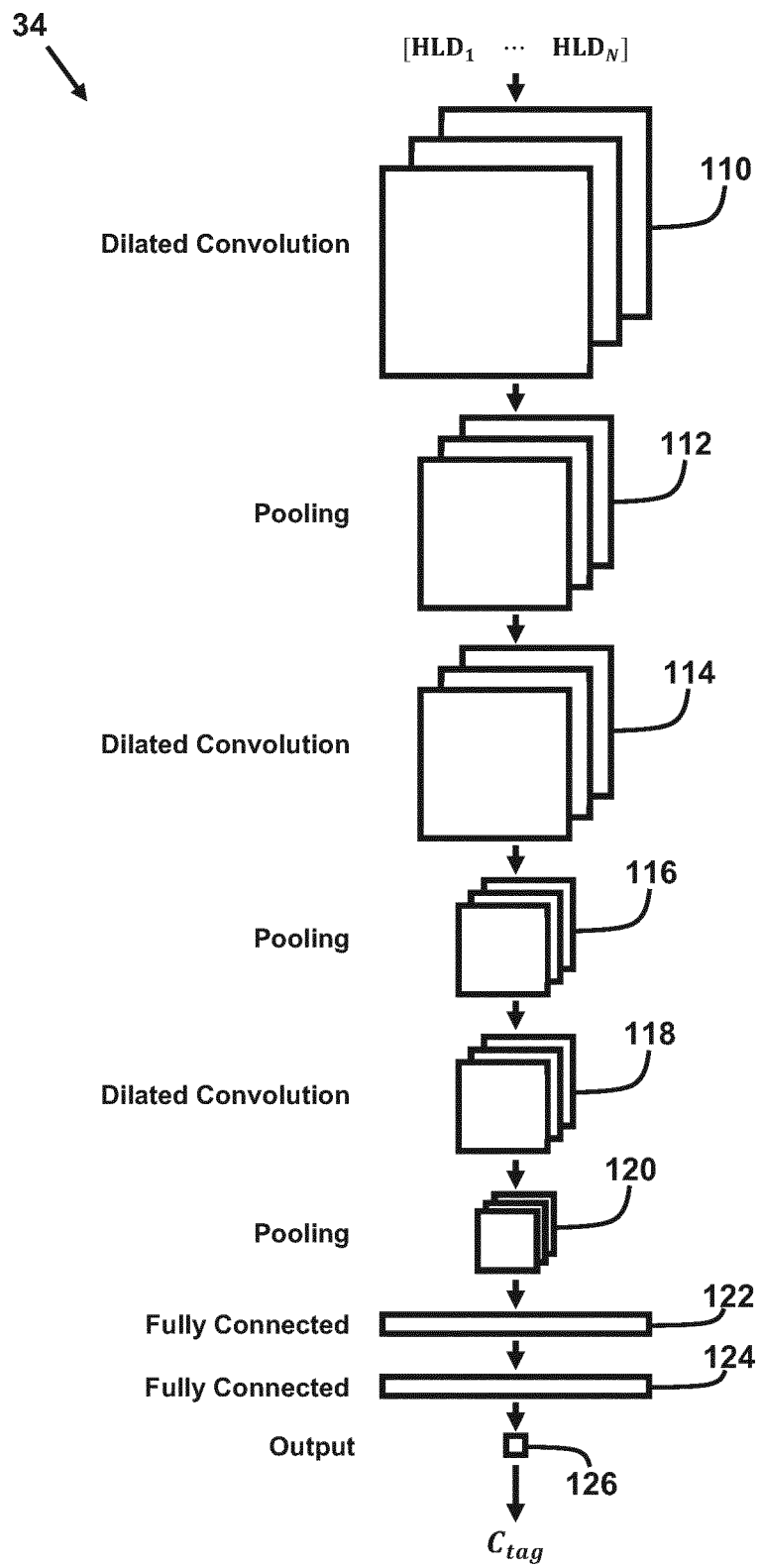
FIG. 3 shows a logical flow diagram illustrating operations of a dilated convolutional neural network audio tagging model of the audio event detection program.

FIG. 3 shows a logical flow diagram illustrating the operations of the DCNN audio tagging model 34 of the audio event detection program 30. The DCNN audio tagging model 34 receives as an input the extracted HLD feature set HLD$_1$, ..., HLD$_N$ for the individual audio clip 102. As discussed above, the extracted HLD feature set HLD$_1$, ..., HLD$_N$ takes the form of a N×M matrix or N×M$_R$ matrix, depending on whether the feature selection and/or feature reduction process is used.

The DCNN audio tagging model 34 utilizes a DCNN (dilated convolution neural network) as a binary classifier to detect and tag the presence of a target audio event in an audio clip. More particularly, the processor 22 is configured to execute program instructions corresponding to the DCNN audio tagging model 34 to determine a classification output indicating the presence or non-presence of a particular target audio event. The usage of dilated convolution layers, as opposed to conventional convolution layers, advantageously enables the DCNN audio tagging model 34 to capture information from different spatial scales, balance local properties, and integrate knowledge of wider context. Particularly, dilated convolution increases receptive view (global view) of the network exponentially, while only growing the number of parameters linearly. The audio tagging problem requires integrating knowledge of the wider context without increasing cost. Thus, the dilated convolution layers perform better in tagging larger audio clips compared to networks with a similar number of network parameters that utilize conventional convolution layers.

It will be appreciated that a convolutional neural networks (CNNs), including DCNNs, are a type of feed-forward neural network that contains a number of convolution layers. A conventional convolution layer receives an input, and applies one or more convolutional filters to the input. A convolutional filter, also referred to as a kernel, is a matrix of weights, also referred to as parameters or filter values, which is applied to various chunks of an input matrix such that the matrix of weights is convolved over the input matrix to provide an output matrix. The dimensions of the output matrix is determined by the kernel size of the filter (i.e., the size of the matrix of weights) and by the "stride" of the filter, which indicates how much the chunks of the input matrix overlap with one another during convolution or are spaced apart from one another during convolution. The various layers and filters of a CNN are used to detect various "features" of the input.

The kernel size of a convolutional filter defines the filter's "receptive field." For example, a conventional CNN for audio event detection might include a sequence of convolution layers used to convolve a time series from audio signal F$_L$ at layer L with a kernel K to obtain time series F$_{L+1}$ at layer L+1. As a result, a CNN with k length filters, (without pooling) will have a receptive field of size L(k−1)+k, where L is the layer index. Thus, the effective receptive field of units can only grow linearly with layers. On the other hand, DCNNs are extensions of conventional CNNs which add spacing between the elements of the kernel k so neighboring points at larger intervals are considered when computing the point x in F$_{L+1}$. The dilated convolution between signal F and kernel k with a dilution factor l is defined as:

$$(k *_l F)_t = \sum_{\tau=-\infty}^{\infty} k_\tau \times F_{t-l\tau}$$

where *$_l$ is the dilated convolution operation with the dilution factor l. This dilated convolution operation *$_l$ differs from that of a conventional convolution operation * in that the term F$_{t-l\tau}$ above would instead be F$_{t-\tau}$ in the conventional convolution operation. In the dilated convolution operation, the kernel addresses the signal at every lth entry.

In the exemplary illustrated embodiment, the DCNN audio tagging model 34 includes three dilated convolution layers 110, 114, and 118. Each of the dilated convolution layers 110, 114, and 118 serves as feature extraction layer and has a predetermined number of filters and/or kernels (e.g., 50) with a predetermined length and/or kernel size (e.g., 4) and a predetermined dilation factor l. In at least one embodiment, the dilution factor l of each dilated convolution layer 110, 114, and 118 is increased between each layer, i.e. the dilution factor l (e.g., 2) of the first dilated convolution layer 110 is less than the dilution factor l (e.g., 4) of the second dilated convolution layer 114 and the dilation factor l (e.g., 4) of the second dilated convolution layer 110 is less than the dilution factor l (e.g., 6) of the third dilated convolution layer 118. In this way, the receptive field can grow exponentially, while the number of trainable parameters grows linearly. In one embodiment, the dilution factor l is increased between each layer such that the same number of parameters can be used in each layer. Each of the dilated convolution layers 110, 114, and 118 is followed by a Rectified Linear Unit (ReLU) activation of the output (not shown).

In the exemplary illustrated embodiment, the DCNN audio tagging model 34 includes pooling layers 112, 116, and 120. Each pooling layer 112, 116, and 120 follows a corresponding one of the dilated convolution layers 110, 114, and 118 and is configured to subsample the output of the respective dilated convolution layer 110, 114, and 118 with a predetermined filter size and/or window size (e.g., 4) and with predetermined pool size and/or downscaling factor (e.g., 2) to reduce the dimensionality of the respective output. It will be appreciated that pooling reduces output dimensionality while keeping the most salient information and provides an output matrix has a fixed size, regardless of the size of the input or the size of the filters. In at least one embodiment, the pooling layer 112, 116, and 120 are max pooling layers, but other pooling techniques may be applied such as average pooling. Max pooling is advantageous for tagging the presence of a target audio event because it maintains audio presence information, while sacrificing the exact timing information for the audio event, which is not needed to tag the presence of the target audio event.

In some embodiments, the DCNN audio tagging model 34 may further include one or more dropout layers (not shown) applied after various layers and configured to dropout a random set (e.g., 20%) of activations. Additionally, in some embodiments, batch normalization, L1/L2 regularization, or the like (not shown) may be applied after various layers.

For the purpose of classification, the output of the third pooling layer 120 is provided to a pair of fully connected dense layers 122 and 124 having a predetermined number of neurons. In one embodiment, the fully connected dense layers 122 and 124 are each followed by ReLU activation of the output (not shown). A final output layer 126 consisting of a single neuron with sigmoid activation receives the output of the second fully connected dense layer 124 and provides a classification output $C_{tag}$ with respect to the presence of a particular target audio event in the individual audio clip 102. In particular, after sigmoid activation the output layer 126 provides a probability (e.g., a value between 0 and 1) that the audio signal 102 includes a particular target audio event and/or probability that the audio signal 102 does not include the particular target audio event. In at least one embodiment, the individual audio clip 102 is considered to include a particular target audio event if the sigmoid activation of the output layer 126 exceeds a predetermined threshold (e.g., 80%).

As discussed above, the audio event detection model of the audio event detection program 30 is configured to detect a predetermined number of target audio events (e.g., a baby crying, glass breaking, a gun being shot, and a person screaming). A synthetic training dataset was generated for each target audio event by combining isolated audio samples for the target audio event with the background audio clips. The training audio clips are labeled for presence or non-presence of the target audio event.

In at least one embodiment, a unique a set of weights and/or parameters for DCNN audio tagging model 34 are derived in a training process for each individual target audio event that is to be detected and for which a synthetic training dataset was generated (e.g., a baby crying, glass breaking, a gun being shot, and a person screaming). Particularly, during a training process, a set of weights and/or parameters are learned and/or optimized for all of the filters in the DCNN audio tagging model 34 for each individual target audio event based on the corresponding synthetic training dataset for the individual target audio event. In at least one embodiment, the optimized values for the set of weights and/or parameters are determined by minimizing a loss function (e.g., a mean squared loss function) that evaluates a classification output $C_{tag}$ of the deep DCNN audio tagging model 34 compared to the correct classification identified by the labeled training data in the synthetic training dataset. The set of weights and/or parameters may be optimized with reference to the loss function using one of a variety of known optimization techniques (e.g., RMSprop optimization) over a predetermined number of epochs (e.g., 30). In some embodiments, the set of weights and/or parameters is initialized with random values, or via any other acceptable initialization technique. Although the optimized values for the set of weights and/or parameters can be generated by the processor 22, they are preferably generated by another a processing system (not shown) beforehand and then stored on the memory 24. The other processing system may be configured in a conventional manner for a computer or the like having at least a processor and a memory configured to store the training dataset and program instructions for training the optimized values for the set of weights and/or parameters, which are executed by the processor.

Thus, a unique set of weights and/or parameters for the DCNN audio tagging model 34 are derived for each for each individual target audio event. The set of weights and/or parameters for each individual target audio event are stored in the memory 24. During usage of the audio event detection program 30, the processor 22 is configured to execute program instructions corresponding to the DCNN audio tagging model 34 with reference to a particular set of weights and/or parameters stored in the memory 24 to determine the classification output $C_{tag}$ indicating the presence or non-presence of the corresponding target audio event.

However, it will be appreciated, that in some alternative embodiments, the DCNN audio tagging model 34 may comprise a multi-class model in which the output layer has neuron with sigmoid activation for each target audio event that is to be detected (e.g., four) to provide a multi-class classification output $C_{tag}$. Thus, a single set of weights and/or parameters may be learned and used for detecting the presence or non-presence of all target audio events that are to be detected.

Audio2Vec Feature Representation

If the classification output(s) $C_{tag}$ of the DCNN audio tagging model 34 indicate that the individual audio clip 102 includes a target audio event, the processor 22 executes program instructions corresponding to the Audio2Vec feature model 36 and the BLSTM classifier model 38 to determine location(s) and/or boundaries in time of the detected target audio event(s). If none of the target audio events are detected in the individual audio clip 102, then the processor 22 does not execute the program instructions corresponding to the Audio2Vec feature model 36 or the BLSTM classifier model 38 and moves on to processing a next audio clip.

Figure 4:
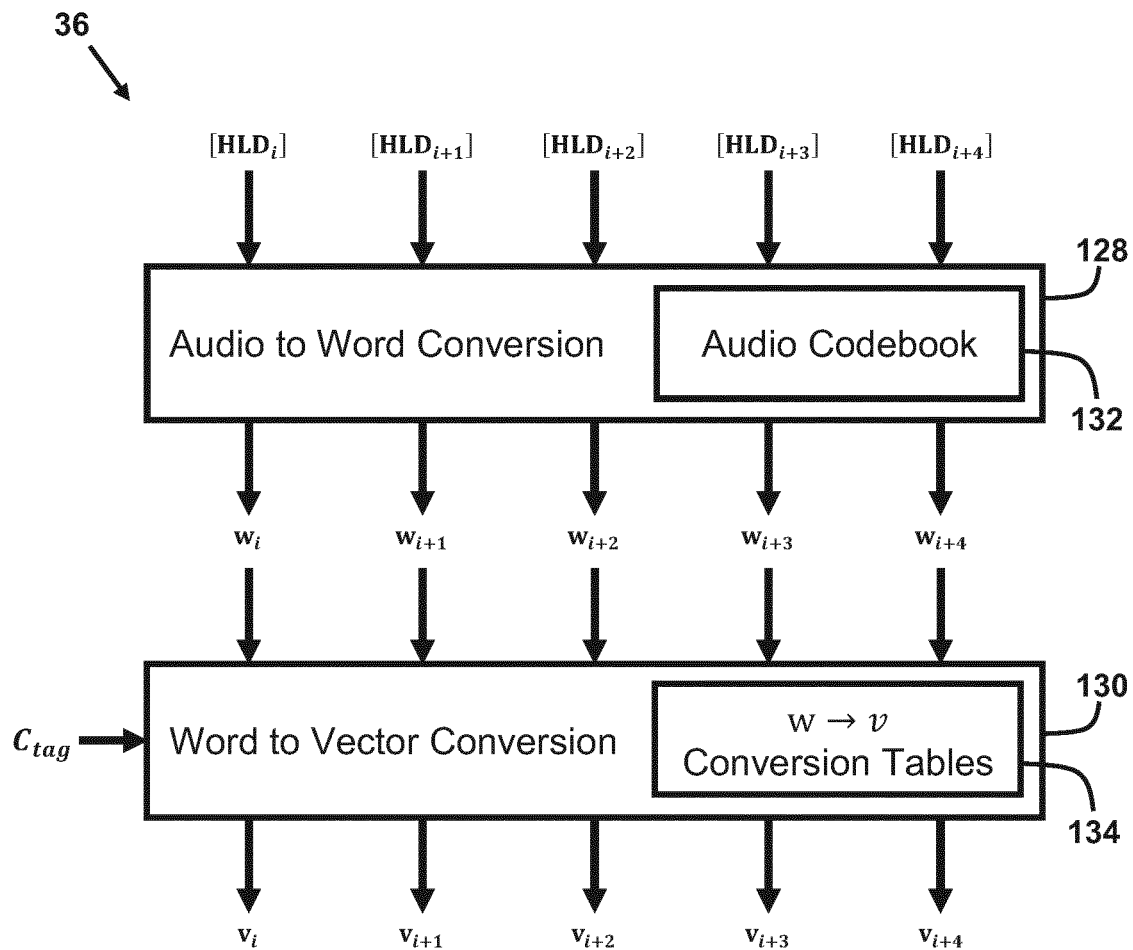
FIG. 4 shows a logical flow diagram illustrating the operations of an Audio2Vec feature model of the audio event detection program.

FIG. 4 shows a logical flow diagram illustrating the operations of the Audio2Vec feature model 36 of the audio event detection program 30. The Audio2Vec feature model 36 receives as an input the extracted HLD feature set $HLD_1, \ldots, HLD_N$ for the individual audio clip 102, as well as the classification output(s) $C_{tag}$ of the DCNN audio tagging model 34. As discussed above, the extracted HLD feature set $HLD_1, \ldots, HLD_N$ takes the form of a N×M matrix or N×$M_R$ matrix, depending on whether the feature selection and/or feature reduction process is used. The processor 22 is configured to execute program instructions corresponding to the Audio2Vec feature model 36 to convert the extracted HLD features $HLD_1$ corresponding to each window segment $S_i$ into a respective audio vector representation $v_i$. The audio vector representation $v_i$ is robust in that, not only does it represent the inherent state of the audio signal 102 during the respective window segment $S_i$, but it advantageously also takes into account the inherent relationship between the audio state and the target audio event detected the audio clip 102.

The Audio2Vec feature model 36 advantageously utilizes a two-step process to convert the extracted HLD features $HLD_1, \ldots, HLD_N$ to corresponding audio vector representations $v_1, \ldots, v_N$. Particularly, each extracted HLD feature set $HLD_i$ is first converted to a respective audio word $w_i$ (block 128) and then each audio word $w_i$ is converted into the respective audio vector representation $v_i$, taking into account the classification output(s) $C_{tag}$ from the DCNN audio tagging model 34 (block 130).

The processor 22 is configured to convert each extracted HLD feature set $HLD_i$ to a respective audio word $w_i$, which is an audio word from a predetermined set of possible audio words defined in an audio codebook 132. It will be appreciated that the audio words are not words in the normal sense of the term "word." Instead, as used herein, the phrase "audio word" means a set or combination of audio features representing a state of an audio signal during a time period. Each audio word in the audio codebook 132 is defined by a unique set of HLD features. The processor 22 is configured to map the extracted HLD feature set $HLD_i$ for each window segment $S_i$ to a closest or best matching audio word $w_i$ from the audio codebook 132. In at least one embodiment, the processor 22 is configured to compare the extracted HLD feature set $HLD_i$ with the unique set of HLD features defining each audio word in the audio codebook 132. The processor 22 is configured to determine which audio word in the audio codebook 132 is closest or best match using a distance formula or the like. It will be appreciated that the conversion of the extracted HLD feature sets into audio words has the effect of quantizing the extracted HLD feature set for each window segment, because an infinite variety of combinations of extracted HLD features are mapped onto a finite number of possible audio words.

In at least one embodiment, to provide a robust set of audio words, HLD feature sets from a random selection of the synthetic training dataset are clustered into a predetermined number of clusters K using a Gaussian Mixture Model (GMM) clustering technique. It will be appreciated, however, that other known clustering techniques such as K-means might also be used to cluster the HLD feature sets. The clusters are used to define the unique set of HLD features corresponding to each audio word in the audio codebook 132. In at least one embodiment, unique set of HLD features corresponding to each audio word correspond to the mean features of the Gaussian densities of the respective cluster. In other words, the unique set of HLD features is defined by the center of the respective cluster. The codebook size of the audio codebook 132 corresponds to the number of clusters K. It will be appreciated that the discriminating power of the audio codebook 132 is governed by the codebook size. In general, larger codebooks are more discriminative, whereas smaller codebooks should generalize better, especially when HLD features are distorted with distance, environmental noise and reverberation, as smaller codebooks are more robust against incorrect assignments. Although the codebook can be generated by the processor 22, it is preferably generated by another a processing system (not shown) beforehand and then stored on the memory 24. The other processing system may be configured in a conventional manner for a computer or the like having at least a processor and a memory configured to store the training dataset and program instructions for deriving the codebook, which are executed by the processor.

The processor 22 is configured to convert each audio word $w_i$ into a respective audio vector representation $v_i$ depending on the classification output $C_{tag}$ from the DCNN audio tagging model 34. The audio vector representations $v_i$ are designed to represent, convey, and/or indicate the inherent relationship between an audio word $w_i$ and a particular target audio event. Particularly, since audio signal states from a particular target audio event are different from others, audio states representing that target audio event are also be different from other audio states. Additionally, some audio states occur more frequently in a target audio event compared to other audio events.

The audio vector representation $v_i$ corresponding to a particular audio word $w_i$ from the codebook 132 is different depending on the particular target audio event. In at least one embodiment, the audio vector representations $v_i$ have a predetermined dimension D (e.g., 2). The position of the audio vector representation $v_i$ in D-dimensional space indicates the strength or nature of the relationship between the respective audio word $w_i$ and the particular target audio event. In at least one embodiment, a plurality of word-to-vector conversion tables 134 or equivalent are stored on the memory 24. The word-to-vector conversion tables 134 include a respective conversion table for each of the target audio events to be detected (e.g., one conversion table for each of a baby crying, glass breaking, a gun being shot, and a person screaming). For each audio word $w_i$ in the individual audio clip 102, the processor 22 is configured to use the conversion table 134 corresponding to the classification output $C_{tag}$ to convert the respective audio word $w_i$ into a respective audio vector representation $v_i$. In at least one embodiment, the correspondence and/or conversion between audio words $w_i$ and audio vector representations $v_i$ for each target audio event is determined based on the synthetic training dataset corresponding to each target audio event.

Figure 5:
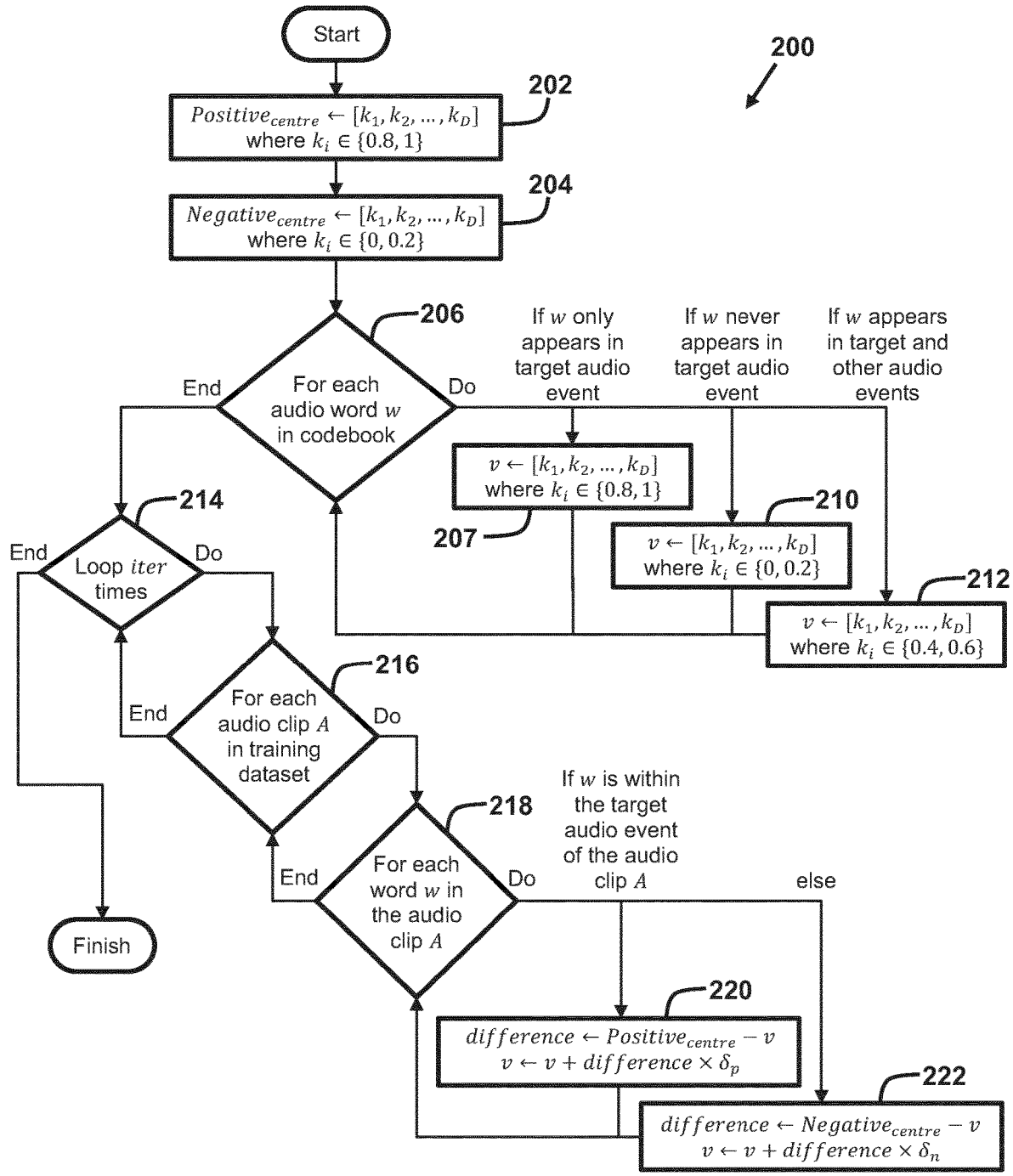
FIG. 5 shows a logical flow diagram illustrating an exemplary algorithm for determining the correspondence audio words and audio vector representations.

FIG. 5 shows a logical flow diagram illustrating an exemplary algorithm 200 for determining the optimal correspondence and/or conversion between audio words w and audio vector representations v for each of the target audio events based on the synthetic training dataset corresponding to each target audio event. Although the algorithm 200 can be performed by the processor 22, it is preferably performed by another a processing system (not shown) beforehand and the resulting word-to-vector conversion tables 134 are stored on the memory 24. The other processing system may be configured in a conventional manner for a computer or the like having at least a processor and a memory configured to store the training dataset and program instructions for training the optimized conversion word to vector conversions, which are executed by the processor.

The algorithm 200 begins by randomly initializing a pair of vectors $Positive_{centre}$ and $Negative_{centre}$ in D-dimensional vector space (blocks 202 and 204). Particularly, the components $k_1, k_2, \ldots, k_D$ of the vector $Positive_{centre}$ are initialized with random values in a first predetermined range (e.g., where $k_i \in \{0.8, 1\}$) (block 202). Similarly, the components $k_1, k_2, \ldots, k_D$ of the vector $Negative_{centre}$ are initialized with random values in a second predetermined range (e.g., where $k_i \in \{0, 0.2\}$), which is different from and/or less than the first predetermined range (block 204).

Next, for each audio word w in the audio codebook 132 (block 206), a corresponding audio vector representation v is randomly initialized depending on whether the audio word w (i) only appears in the target audio event, (ii) never appears in the target audio event, or (iii) appears in the both the target audio event and other audio events, based on the synthetic training samples corresponding to the target audio event. As discussed above, the audio clips in the synthetic training dataset are annotated to indicate the position in time of the target audio event within the training audio clip. If a respective audio word w only appears in the target audio event, the components $k_1, k_2, \ldots, k_D$ of the corresponding audio vector representation v are initialized with random values in the first predetermined range (e.g., where $k_i \in \{0.8, 1\}$) (block 208). If a respective audio word w never appears in the target audio event, the components $k_1, k_2, \ldots, k_D$ of the corresponding audio vector representation v are initialized with random values in the second predetermined range (e.g., where $k_i \in \{0, 0.2\}$) (block 210). Finally, if a respective audio word w appears in the target audio event and other audio events, the components $k_1, k_2, \ldots, k_D$ of the corresponding audio vector representation v are initialized with random values in a third predetermined range (e.g., where $k_i \in \{0.4, 0.6\}$), which is between the first and second predetermined ranges (block 212).

After initialization a plurality of iterations are performed (block 214) in which each audio vector representation v is optimized and/or refined based on how often the respective audio word w appears within the target audio event. Particularly, for each training audio clip A in the synthetic training dataset (block 216), for each audio word w in the training audio clip A (block 218), it is determined whether the respective audio word w is within the target audio event of the respective training audio clip A. If the audio word w is within the target audio event of the respective training audio clip A, then the audio vector representation v is adjusted according to the formula $v \leftarrow v + (Positive_{centre} - v) \times \delta_p$, where $\delta_p$ is a small constant (block 220). Conversely, if the audio word w is not within the target audio event of the respective training audio clip A, then the audio vector representation v is adjusted according to the formula $v \leftarrow v + (Negative_{centre} - v) \times \delta_n$, where $\delta_n$ is a small constant (block 222).

The iteration process (block 214) of the algorithm 200 has the effect of moving audio vector representations v that have a strong positive correlation with the target audio event closer to the vector $Positive_{centre}$ in the vector space. Likewise, iteration process (block 214) of the algorithm 200 has the effect of moving audio vector representations v that have a strong negative correlation with the target audio event closer to the vector $Negative_{centre}$ in the vector space. Finally, the iteration process (block 214) of the algorithm 200 has the effect of moving audio vector representations v that have weak or no significant correlation with the target audio event into a region of vector space between the vectors $Positive_{centre}$ and $Negative_{centre}$. Additionally, it will be appreciated that, since the target audio events are generally only few seconds in a 30 second audio clip, the total number of audio words that appear within the target audio event is significantly less than the total number of audio words that do not appear within the target audio event. In one embodiment, to mitigate this bias, the small constants $\delta_n$ and $\delta_p$ are calculated according to the formula $$\delta_n = \frac{N_p}{N_n} \times \delta_p,$$

where N is the total number of audio words within target audio event and $N_n$ is the total number of audio words not within the target audio event.

The algorithm 200 can be executed with respect to each target audio event that is to be detected (e.g., a baby crying, glass breaking, a gun being shot, and a person screaming) in order to derive the respective word-to-vector conversion tables 134 that are stored on the memory 24. However, it will be appreciated that any other suitable method can be used to derive the word-to-vector conversion tables 134 such that the resulting audio vector representations v indicate the strength or nature of the relationship between the respective audio word $w_i$ with a particular target audio event.

Bidirectional LSTM Classifier

Figure 6:
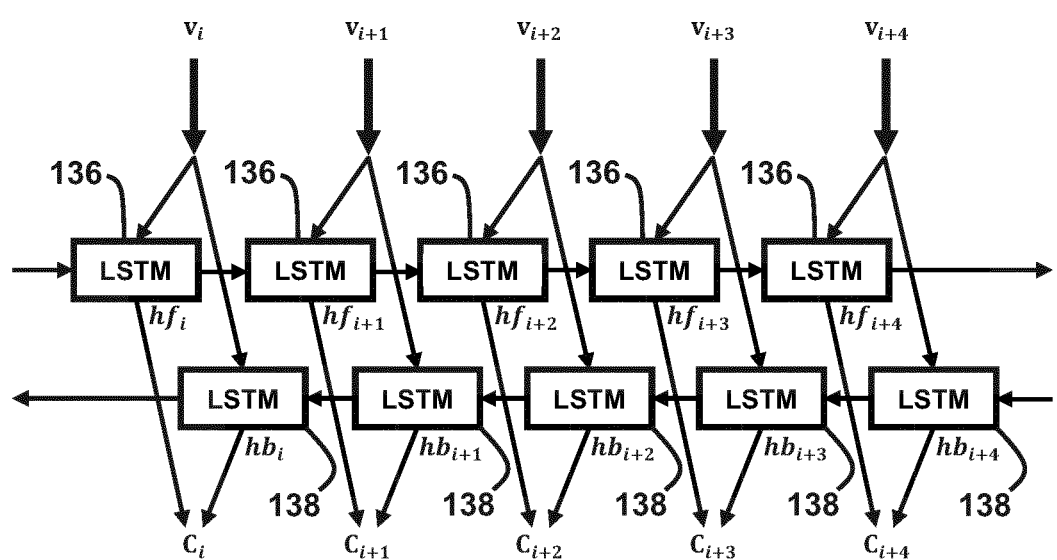
FIG. 6 shows a logical flow diagram illustrating the operations of a bi-directional long short-term memory classifier model of the audio event detection program.
Figure 7:
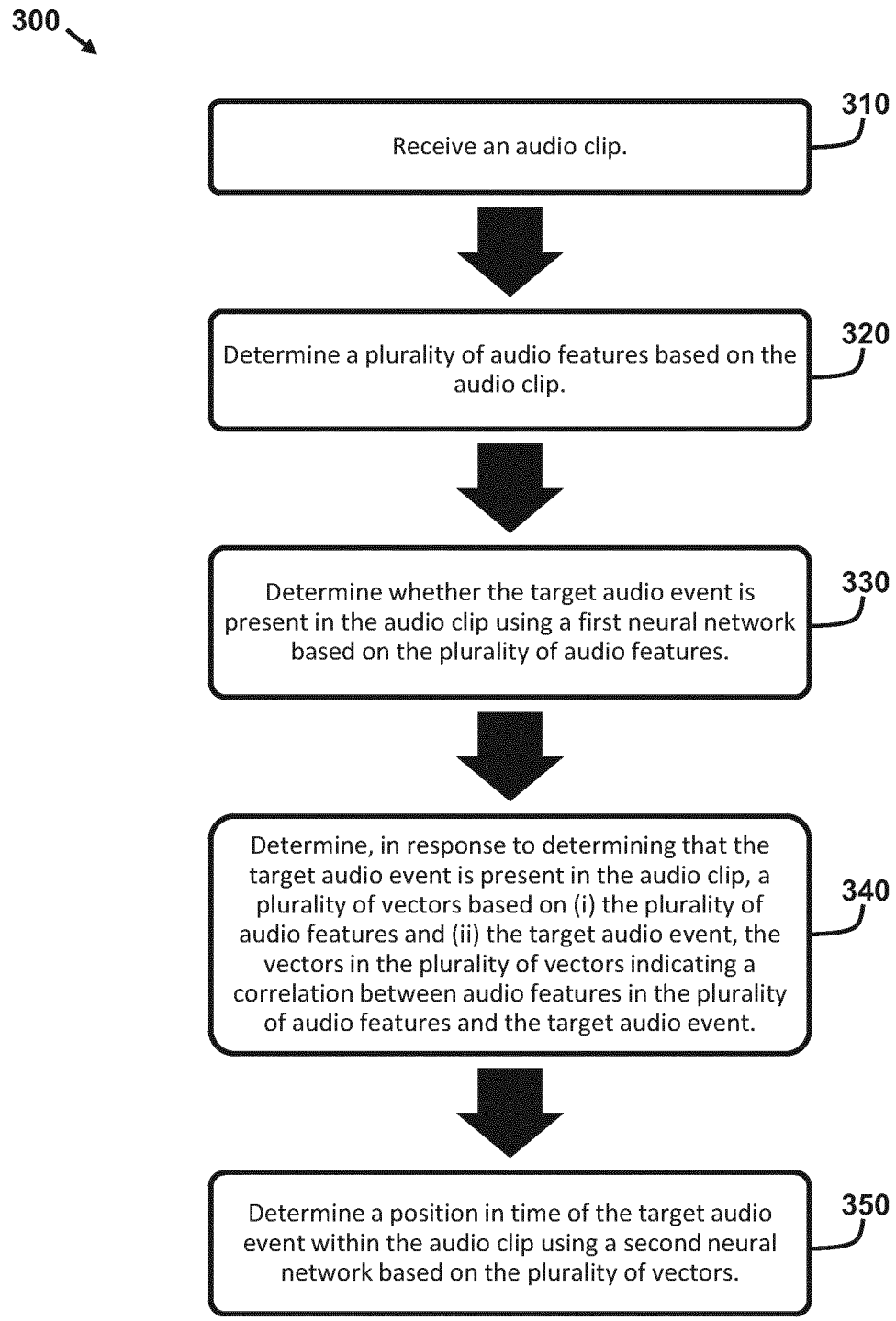
FIG. 7 shows a logical flow diagram illustrating a method for detecting and localizing a target audio event in an audio clip using the audio surveillance system.

FIG. 6 shows a logical flow diagram illustrating the operations of the BLSTM classifier model 38 of the audio event detection program 30. The DCNN audio tagging model 34 receives as an input the sequence of audio vector representations $v_1, \ldots, v_N$ for the individual audio clip 102. As discussed above, the sequence of audio vector representations $v_1, \ldots, v_N$ correspond to the sequence of overlapping window segments $S_1, \ldots, S_N$ of the individual audio clip 102 and represent the inherent audio state of each window segment $S_i$ as well as the relationship between the inherent audio state and the particular target audio event detected in the audio clip 102. The BLSTM classifier model 38 is configured to determine for each window segment $S_i$ whether it includes the target audio event or does not include the target audio event. In this way, the BLSTM classifier model 38 determines the boundaries in time of the target audio event within the individual audio clip 102.

Although many different classifier models may be used, the illustrated BLSTM (Bidirectional Long Short Term Memory) classifier model 38 utilizes a type of recurrent neural network (RNN) that is referred to as an LSTM (Long Short Term Memory) cell, which is advantageous for modeling long-term dependencies. It will be appreciated that an LSTM cell contains an internal cell state $c_t$ that is generally passed from one LSTM cell to the next in a chain of LSTM cells. The LSTM cell is configured to selectively add information to its internal cell state $c_t$ (i.e. remember) or remove information from the internal cell state $C_t$ (i.e. forget). The addition and/or removal of information is regulated by operation gates of the LSTM cell. In a conventional LSTM cell, the operation gates include a forget gate, an input gate, and an output gate. First, the forget gate includes a sigmoid neural network layer configured to determine what information to remove from the old internal cell state $c_{t-1}$ based on its input $x_t$ and a previous hidden state $h_{t-1}$, which is also the output of the previous LSTM cell in the chain. Next, the input gate includes a sigmoid neural network layer and a hyperbolic tangent (tanh) neural network layer configured to determine what information to add to the old internal cell state $c_{t-1}$ based on its input $x_t$ and a previous hidden state $h_{t-1}$. The LSTM cell determines a new internal cell state $c_t$ based on the old internal cell state $c_{t-1}$ and the determinations of the forget gate and the input gate. Finally, the output gate includes a sigmoid neural network layer configured to determine what parts of the new internal cell state $c_t$ to provide as the output $h_t$ of the LSTM cell. It will be appreciated that variants of the conventional LSTM cell having slightly different operations may also be used.

The BLSTM classifier model 38 includes a first plurality of LSTM cells 136 and a second plurality of LSTM cells 138. The first plurality of LSTM cells 136 includes N individual LSTM cells 136, where N is the total number of window segments $S_i$ for the respective audio clip 102. Each LSTM cell 136 is configured to receive as its input a respective one of the sequence of audio vector representations $v_1, \ldots, v_N$. Similarly, the second plurality of LSTM cells 138 also includes N individual LSTM cells 138 and each LSTM cell 138 is configured to receive as its input a respective one of the sequence of audio vector representations $v_1, \ldots, v_N$. The first plurality of LSTM cells 136 is chained together in a forward arrangement and the second plurality of LSTM cells 138 is chained together in a backward arrangement.

As used herein a "forward arrangement" means that the internal cell states $c_t$ of the LSTM cells are passed forward to a next LSTM cell, which receives as its input the audio vector representation $v_{i+1}$ corresponding to the next in time window segment $S_{1+1}$. Conversely, as used herein a "backward arrangement" means that the internal cell states $c_t$ of the LSTM cells are passed backward to a previous LSTM cell, which receives as its input the audio vector representation $v_{i-1}$ corresponding to the previous in time window segment $S_{i-1}$. In this way, for a specific window segment $S_i$, the BLSTM classifier model 38 takes into consideration past features via the forward arrangement of first plurality of LSTM cells 136 and future features via the backward arrangement of second plurality of LSTM cells 138 state.

The neural network layers of the individual LSTM cells in the first plurality of LSTM cells 136 and in the second plurality of LSTM cells 138 perform their respective functions with reference to a set of weights and/or parameters, which are learned and optimized during a training process. The optimized set of weights and/or parameters are stored in the memory 24. During usage of the audio event detection program 30, the processor 22 is configured to execute program instructions corresponding to the BLSTM classifier model 38 with reference to the set of weights and/or parameters stored in the memory 24. Although the optimal values the set of weights and/or parameters can be generated by the processor 22, they are preferably generated by another a processing system (not shown) beforehand and then stored on the memory 24. The other processing system may be configured in a conventional manner for a computer or the like having at least a processor and a memory configured to store the training dataset and program instructions for training the optimized values for the set of weights and/or parameters, which are executed by the processor.

The processor 22 is configured to execute program instructions corresponding to the first plurality of LSTM cells 136 with reference to the set of weights and/or parameters stored on the memory 24 to determine a sequence of forward outputs $hf_1, \ldots, hf_N$. Similarly, the processor 22 is configured to execute program instructions corresponding to the second plurality of LSTM cells 138 with reference to the set of weights and/or parameters stored on the memory 24 to determine a sequence of backward outputs $hb_1, \ldots, hb_N$. The processor 22 is configured to determine a sequence of classification outputs $C_1, \ldots, C_N$ by combining the sequence of forward outputs $hf_1, \ldots, hf_N$ and the sequence of backward outputs $hb_1, \ldots, hb_N$. Particularly, the processor 22 is configured to combine the individual elements sequence of forward outputs $hf_1, \ldots, hf_N$ with the corresponding individual elements of the sequence of backward outputs $hb_1, \ldots, hb_N$ to arrive at the individual elements of the sequence of classification outputs $C_1, \ldots, C_N$. The processor 22 may be configured to use a variety of different operations to combine individual elements such as, but not limited to, summation, multiplication, averaging, and concatenation. Each element of the sequence of classification outputs $C_1, \ldots, C_N$ indicates whether the respective window segment $S_i$ includes the target audio event or does not include the target audio event. Thus, in this way, the sequence of classification outputs $C_1, \ldots, C_N$ defines the boundaries in time of the target audio event within the individual audio clip 102.

Method for Audio Event Detection

Methods for operating the audio surveillance system 10 are described below. In particular, methods of operating the audio surveillance system 10 to for detect and localize a target audio event in an audio clip are described. In the description of the methods, statements that a method is performing some task or function refers to a controller or general purpose processor executing programmed instructions stored in non-transitory computer readable storage media operatively connected to the controller or processor to manipulate data or to operate one or more components in the audio surveillance system 10 to perform the task or function. Particularly, the processor 22 of the surveillance computer 20 above may be such a controller or processor. Alternatively, the controller or processor may be implemented with more than one processor and associated circuitry and components, each of which is configured to form one or more tasks or functions described herein. It will be appreciated that some or all of the operations the method can also be performed by a remote server or cloud processing infrastructure. Additionally, the steps of the methods may be performed in any feasible chronological order, regardless of the order shown in the figures or the order in which the steps are described.

FIG. 8 shows a logical flow diagram for a method 300 of operating an audio surveillance system 10 to detect a target audio event. The method 300 improves upon the functioning of the audio surveillance system 10 and, more particularly, the functioning of the processor 22 of the surveillance computer 20, by advantageously utilizing a novel audio event detection model. As described in detail above, the audio event detection model advantageously utilizes a hierarchical approach in which a dilated convolutional neural network to detect the presence of the target audio event anywhere in an audio clip. If the target audio event is detected somewhere in the audio clip, the audio event detection model utilizes a robust audio vector representation that encodes the inherent state of the audio as well as a learned relationship between state of the audio and the particular target audio event that was detected in the audio clip. A bi-directional long short term memory classifier is advantageously used to model long term dependencies and determine the boundaries in time of the target audio event within the audio clip based on the audio vector representations.

The method 300 begins with a step of receiving an audio clip (block 310). Particularly, the processor 22 of the surveillance computer 20 is configured to receive at least one audio clip from the audio input devices 12. As discussed above, in some embodiments, the processor 22 is configured to receive audio surveillance signals in the form of audio clips having a predetermined length (e.g., 30 seconds). In some embodiments, the processor 22 is configured to receive the audio surveillance signals in the form of an audio stream and divide the audio stream into audio clips having a predetermined length (e.g., 30 seconds).

The method 300 continues with a step of determining a plurality of audio features based on the audio clip (block 320). Particularly, the processor 22 of the surveillance computer 20 is configured to execute program instructions corresponding to the audio feature extractor 32 of the audio event detection program 30 to determine a plurality of audio features $HLD_1, \ldots, HLD_N$ based on the received audio clip. As discussed above, in at least one embodiment, the plurality of HLD audio features $HLD_1, \ldots, HLD_N$ include a set of HLD audio features $HLD_1$ corresponding to each window segment $S_i$ in a sequence of window segments $S_1, \ldots, S_N$ of the audio clip having a predetermined length and a predetermined amount of overlap. As discussed above, in at least one embodiment, the processor 22 is configured to determine each set of audio features $HLD_1$ by determining a set of LLD audio features $LLD_{ij}$ for each sub-segment $S_{ij}$ in a sequence of sub-segments of each window segment $S_i$.

The method 300 continues with a step of determining whether the target audio event is present in the audio clip using a first neural network based on the plurality of audio features (block 330). Particularly, the processor 22 of the surveillance computer 20 is configured to execute program instructions corresponding to the DCNN audio tagging model 32 of the audio surveillance program 30 to determine whether the target audio event is present in the audio clip based on the plurality of HLD audio features $HLD_1, \ldots, HLD_N$. As discussed above, in at least one embodiment, the processor 22 is configured to determine a classification output(s) $C_{tag}$ indicating whether the target audio event is present in the audio clip using a DCNN having a sequence of dilated convolution layers 110, 114, 118 configured to perform a sequence of dilated convolution operations with increasing dilation factors 1.

The method 300 continues with a step of determining, in response to determining that the target audio event is present in the audio clip, a plurality of vectors based on (i) the plurality of audio features and (ii) the target audio event, the vectors in the plurality of vectors indicating a correlation between audio features in the plurality of audio features and the target audio event (block 340). Particularly, if the target audio event is detected in the audio clip, the processor 22 of the surveillance computer 20 is further configured to execute program instructions corresponding to the Audio2Vec feature model 36 of the audio surveillance program 30 to determine a plurality of audio vector representations $v_1, \ldots, v_N$ based on the plurality of audio features $HLD_1, \ldots, HLD_N$ and the classification output(s) $C_{tag}$. As discussed above, in at least one embodiment, the processor 22 is configured to identify a respective audio word $w_i$ in the audio codebook 132 that is a closest match each set of audio features $HLD_1$ corresponding to each window segment $S_i$. Next, as discussed above, the processor 22 is configured to convert each audio word $w_i$ into the respective audio vector representation $v_i$ using audio word to vector conversion tables 134 corresponding to the particular target audio event detected in the audio clip.

Finally, the method 300 continues with a step of determining a position in time of the target audio event within the audio clip using a second neural network based on the plurality of vectors (block 350). Particularly, the processor 22 of the surveillance computer 20 is configured to execute program instructions corresponding to the BLSTM classifier model 38 of the audio surveillance program 30 to determine a position in time of the target audio event within the audio clip based on the plurality of audio vector representations $v_1, \ldots, v_N$. As discussed above, in at least one embodiment, the processor 22 is configured to determine the position in time of the target audio event within the audio clip using a recurrent neural network having a first plurality of LSTM cells 136 chained together in a forward arrangement and a second plurality of LSTM cells 138 is chained together in a backward arrangement. The processor 22 is configured to combine the output of the first plurality of LSTM cells 136 with the output of the second plurality of LSTM cells 138 to determine whether the target audio event is detected in each individual window segment $S_i$, thereby determining the position in time of the target audio event within the audio clip.

In some embodiments, the processor 22 is configured to store information regarding the detected target audio event and/or the position in time of the detected target audio event in the memory 24 in the form of an event log, event timeline, or the like. In some embodiments, the processor 22 is configured to operate one of the output devices 14 to output some perceptible output regarding the detected target audio event and/or the position in time of the detected target audio event, such as an alarm sound from a speaker, a notification or alert on a display screen, or an interactive event log/event timeline on a display screen.

Embodiments within the scope of the disclosure may also include non-transitory computer-readable storage media or machine-readable medium for carrying or having computer-executable program instructions (e.g., the audio event detection program 30) or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable program instructions or data structures. Combinations of the above should also be included within the scope of the non-transitory computer-readable storage media or machine-readable medium.

Computer-executable program instructions include, for example, instructions and data which cause a general purpose computer, special purpose computer, or special purpose processing device to perform a certain function or group of functions. Computer-executable program instructions also include program modules that are executed by computers in stand-alone or network environments. Generally, program modules include routines, programs, objects, components, and data structures, etc. that perform particular tasks or implement particular abstract data types. Computer-executable program instructions, associated data structures, and program modules represent examples of the program code means for executing steps of the methods disclosed herein. The particular sequence of such executable instructions or associated data structures represents examples of corresponding acts for implementing the functions described in such steps.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A method for detecting and localizing a target audio event in an audio clip, the method comprising:
   receiving, with a processor, an audio clip;
   determining, with the processor, a plurality of audio features based on the audio clip;
   determining, with the processor, whether the target audio event is present in the audio clip using a first neural network based on the plurality of audio features;
   determining, with the processor, in response to determining that the target audio event is present in the audio clip, a plurality of vectors based on (i) the plurality of audio features and (ii) the target audio event, the vectors in the plurality of vectors indicating a correlation between audio features in the plurality of audio features and the target audio event; and
   determining, with the processor, a position in time of the target audio event within the audio clip using a second neural network based on the plurality of vectors.

2. The method of claim 1, the determining the plurality of audio features further comprising:

segmenting the audio clip into a plurality of audio segments with a first predetermined length; and determining, for each audio segment in the plurality of audio segments, a set of first audio features based on the respective audio segment, the plurality of audio features including the sets of first audio features corresponding to the plurality of audio segments.

3. The method according to claim 2, the segmenting the audio clip further comprising:

segmenting the audio clip into the plurality of audio segments with the first predetermined length and a first predetermined amount of overlap between adjacent audio segments in the plurality of audio segments.

4. The method according to claim 2, the determining the plurality of audio features further comprising:

segmenting each audio segment in the plurality of audio segments into a plurality of audio sub-segments with a second predetermined length that is shorter than the first predetermined length; and determining, for each audio sub-segment in each plurality of audio sub-segments, a set of second audio features based the respective audio sub-segment;

determining, for each audio segment in the plurality of audio segments, the first set of audio features based on the sets of second audio features corresponding to the plurality of audio sub-segments of the respective audio segment.

5. The method according to claim 4, the segmenting each audio segment further comprising:

segmenting each audio segment in the plurality of audio segments into the plurality of audio sub-segments with the second predetermined length and a second predetermined amount of overlap between adjacent audio sub-segments in the plurality of audio sub-segments.

6. The method of claim 1, wherein the first neural network is a convolutional neural network having at least one dilated convolution layer configured to perform a convolution operation with a first dilation factor.

7. The method of claim 6, wherein the convolutional neural network has a sequence of dilated convolution layers configured to perform a sequence of convolution operations with increasing dilation factors.

8. The method of claim 2, the determining the plurality of vectors further comprising:

determining, for each audio segment in the plurality of audio segments, a vector based on the set of first audio features corresponding to the respective audio segment, the plurality of vectors including the vector corresponding to each audio segment in the plurality of audio segments.

9. The method of claim 8, the determining the plurality of vectors further comprising:

identifying, for each audio segment in the plurality of audio segments, an audio word from an defined set of audio words that is a closest match to the set of first audio features corresponding to the respective audio segment; and determining, for each audio segment in the plurality of audio segments, the vector corresponding to the respective audio segment based on (i) the identified audio word for the respective audio segment and (ii) predefined conversions between audio words in the defined set of audio words and corresponding vectors, the predefined conversions depending on the target audio event.

10. The method of claim 9, wherein the defined set of audio words is generated by clustering audio features of a plurality of training audio clips using a Gaussian Mixture Model clustering technique.

11. The method of claim 9, wherein the predefined conversions between audio words in the defined set of audio words and corresponding vectors indicate a correlation between each respective audio word in the defined set of audio words and the target audio event.

12. The method of claim 11, wherein the predefined conversions between audio words in the defined set of audio words and the corresponding vectors are determined based a plurality of training audio clips that are annotated to indicate a presence and a position in time of the target audio event.

13. The method of claim 2, the determining the position in time of the target audio event within the audio clip further comprising:

determining, for each audio segment in the plurality of audio segments, whether the target audio event is present in the respective audio segment based on the plurality of vectors using the second neural network.

14. The method according to claim 13, wherein the second neural network is a recurrent neural network having at least one long short term memory cell.

15. The method according to claim 14, wherein the recurrent neural network has a first plurality of long short term memory cells connected in a forward arrangement and a second plurality of long short term memory cells connected in a backward arrangement.

16. The method according to claim 15, the determining the position in time of the target audio event within the audio clip further comprising:

combining an output of the first plurality of long short term memory cells with an output of the second plurality of long short term memory cells.

17. The method according to claim 1, wherein the first neural network and the second neural network are trained using synthetic training audio clips generated by combining sample audio clips containing the target audio event with background audio clips that do not contain the target audio event, the background audio clips being longer than the sample audio clips.

18. The method according to claim 1 further comprising:

operating, with the processor, a memory storage to store in an event log an indication of at least one of (i) whether the target audio event is present in the audio clip, and (ii) position in time of the target audio event within the audio clip.

19. The method according to claim 1 further comprising:

operating, with the processor, an output device to generate an output indicating at least one of (i) whether the target audio event is present in the audio clip, and (ii) position in time of the target audio event within the audio clip.

20. A system for detecting and localizing a target audio event in an audio clip, the method comprising:

a microphone configured to record audio clips of an environment; and a processor operably connected to the microphone and configured to:

receive an audio clip recorded by the microphone;

determine a plurality of audio features based on the audio clip;

determine whether the target audio event is present in the audio clip using a first neural network based on the plurality of audio features;

determine, in response to determining that the target audio event is present in the audio clip, a plurality of vectors based on (i) the plurality of audio features and (ii) the target audio event, the vectors in the plurality of vectors indicating a correlation between audio features in the plurality of audio features and the target audio event; and determine a position in time of the target audio event within the audio clip using a second neural network based on the plurality of vectors.

\* \* \* \* \*